# 3,019,234
METHOD OF RECOVERING BUTADIENE MONOXIDE

Malcolm Korach and Walker H. Rideout, Corpus Christi, Tex., assignors, by mesne assignments, to Pittsburgh Plate Glass Company
No Drawing. Filed May 26, 1959, Ser. No. 815,818
11 Claims. (Cl. 260—348)

This invention relates to a novel method of recovering butadiene monoxide. Applicants have found that butadiene monoxide may be prepared by reaction of a percarboxylic acid with butadiene. The reaction results also in the production of the corresponding carboxylic acid. For example, when peracetic acid is reacted with butadiene, butadiene monoxide and acetic acid are formed. The problem of separating acetic acid or like carboxylic acid (particularly the lower carboxylic acids containing up to 4 carbon atoms) from butadiene monoxide is complicated by the fact that the acetic acid tends to react with the butadiene monoxide and thereby to reduce the yield of butadiene monoxide isolated.

According to this invention, carboxylic acid commonly present with butadiene monoxide as a consequence of epoxidation of butadiene using a percarboxylic acid may be separated from the butadiene monoxide by forming a solution of the butadiene monoxide and carboxylic acid and a solvent having a low solubility or which is immiscible with water, and extracting or washing the organic solution with water. By following this procedure, the acetic acid is removed substantially completely from the organic solution. While some butadiene monoxide is extracted with the water, the butadiene monoxide remaining in the organic solvent is thus essentially free from acetic or like carboxylic acid.

According to a further embodiment of this invention, it has been found that the amount of butadiene monoxide which is extracted into the water phase in this process may be substantially reduced by using an aqueous solution of a soluble alkali metal salt or water soluble alkaline earth metal salt to achieve the extraction or washing of the acetic acid from the organic solution of butadiene monoxide. Sulphates, such as sodium sulphate, potassium sulphate or magnesium sulphate, are especially valuable for this purpose since essentially complete removal of acetic acid can be achieved with only a few washings or a few stages of extraction.

Solutions of alkali or alkaline earth metal chlorides, bromides or other halides, such as sodium chloride, potassium chloride, calcium chloride, magnesium chloride, barium chloride or the like, also may be used to effect this washing. However, more stages of washing usually are required for chlorides or like halides than when sulphates are used. It is also possible to use solutions of the corresponding nitrates, phosphates, acetates, and like inert salts of mineral acids, preferably salts of acids which are at least as strong as acetic acid.

Since water itself may be used for the extraction, the concentration of salt in the solution used to extract the acetic acid from the butadiene monoxide solution depends to a large degree upon the desirability of reducing the amount of butadiene monoxide extracted by the water. Where it is desirable to substantially reduce the amount of the monoxide thus extracted, the aqueous solution should contain at least about 30 grams of the salt per liter of solution. Where some extraction of the monoxide can be tolerated, the salt concentration rarely is below 10 grams of the salt per liter of solution. Normally, substantially saturated solutions of the salts are used.

An especially valuable group of solvents which can be used as herein contemplated are the chlorinated hydrocarbons, such as ethylene dichloride, carbon tetrachloride, trichloroethylene, perchloroethylene, 1-chloro-2-methyl butane, orthodichlorobenzene, methylene chloride, chloroform, methyl chloride, and the like. Other solvents, such as benzene, toluene, diethyl ether, and like solvents which are immiscible with water (i.e., those which dissolve less than 10 grams of $H_2O$ per liter) may be used to dissolve the butadiene monoxide.

The mixture of carboxylic acid and butadiene monoxide usually is produced by reaction of peracetic acid with butadiene. In lieu of peracetic acid, perpelargonic and other peracids, such as trichloroperacetic acid, trifluoroperacetic acid, perpropionic acid, and the like may be used. In addition, the reaction may be conducted reacting butadiene in the solvent with acetaldehyde monoperacetate, propionaldehyde monoperacetate or like peracylate such as described in British Patent No. 735,974.

The reaction product thus obtained comprises the butadiene monoxide, solvent if present, and the carboxylic acid (acetic acid or the like).

The following examples are illustrative:

Example I

Five hundred milliliters of ethylene dichloride was placed in a one-liter reactor and the temperature of the ethylene dichloride was held at 40° C. Fifty grams of butadiene was added and the solution was agitated and 0.75 mole of peracetic acid was added over a period of 30 minutes as a 40 percent solution of peracetic acid in acetic acid while holding the temperature of the solution at 40° C.

The solution was allowed to stand at 40° C. for two hours and was then cooled to 0° C. While maintaining the solution at substantially 0° C., it was washed 10 times with a saturated aqueous solution of sodium sulphate using in each wash an amount of sodium sulphate solution equal to 10 percent by weight of the butadiene monoxide solution. All of the evolved acetic acid was removed without appreciable removal of butadiene monoxide from the ethylene dichloride solution.

In similar experiments using water in lieu of sodium sulphate, only about 15 percent of the butadiene monoxide was lost when water was used as the washing medium. No appreciable loss took place using saturated sodium chloride solution.

Similar results are attained using propylene dichloride or when using perpelargonic acid in lieu of peracetic acid.

Example II

Five hundred milliliters of monochlorobenzene was placed in a one-liter flask. 0.75 mole of peracetic acid aqueous solution, in which the peracetic acid concentration was 40 percent by weight, was treated with 5.02 grams of sodium acetate to bind the $H_2SO_4$ therein. This solution was then added to the monochlorobenzene. Butadiene-1,3 was added until the peracetic acid was consumed. The resulting solution was then extracted while at 0° C. with saturated aqueous sodium sulphate solution at 0° C. until the organic solution was free from acid. The organic solution contained butadiene monoxide which would be recovered upon distillation of the monochlorobenzene therefrom. A similar result is obtained when orthodichlorobenzene is used in lieu of monochlorobenzene.

Example III

Five hundred milliliters of isopropyl acetate was placed in a one-liter flask. 0.75 mole of butadiene was introduced into the solvent and thereafter 0.75 mole of peracetic acid was added as an aqueous solution containing 40 percent by weight of peracetic acid which had been treated with sodium acetate to remove sulphuric acid. The solution was agitated until the peracetic acid concentration was below 5 percent by weight. This solution is extracted while at 0° C. with a saturated solution of sodium sulphate, also at 0° C., until the acetic acid is removed from the organic solution.

The extraction is especially effective when the temperature of the solution undergoing extraction is below 25° C., for example, below 15° C.

Although the present invention has been described with reference to specific details of certain embodiments, it is not intended that such details shall be regarded as limitations upon the scope of the invention except insofar as included in the accompanying claims.

This application is a continuation-in-part of our co-pending application Serial No. 663,392, filed June 4, 1957, now Patent No. 2,976,223, March 21, 1961.

What is claimed:
1. A method of separating acetic acid from a mixture of butadiene monoxide and acetic acid which comprises washing a solution of said butadiene monoxide acetic acid mixture in inert water immiscible organic solvent, with a water solution of an inert alkali metal salt.
2. The process of claim 1 wherein the salt is a sulphate.
3. The process of claim 1 wherein the salt is sodium sulphate.
4. A method of separating acetic acid from a mixture of butadiene monoxide and acetic acid which comprises washing a solution of said butadiene monoxide-acetic acid mixture in an inert water immiscible organic solvent, with a water solution of an inert alkali metal salt at a temperature below 25° C.
5. A method of separating acetic acid from a mixture of butadiene monoxide and acetic acid which comprises washing a solution of said butadiene monoxide-acetic acid mixture in an inert water immiscible organic solvent, with a water solution of an inert water soluble salt of a metal of the group consisting of alkali and alkaline earth metals.
6. The process of claim 5 wherein the salt is a sulphate.
7. The process of claim 5 wherein the salt is magnesium sulphate.
8. A method of separating acetic acid from a mixture of butadiene monoxide and acetic acid which comprises washing a solution of said butadiene monoxide-acetic acid mixture in an inert water immiscible organic solvent, with a water solution of an inert water soluble salt of a metal of the group consisting of alkali and alkaline earth metals at a temperature below 25° C.
9. The process of claim 1 wherein the inert water immiscible organic solvent is a liquid chlorinated organic hydrocarbon.
10. In the process of separating residual water soluble carboxylic acid from a mixture of a water soluble carboxylic acid and butadiene monoxide resulting from the epoxidation of butadiene with a percarboxylic acid, the improvement which comprises forming a solution of said mixture of a water soluble carboxylic acid and butadiene monoxide in an inert water immiscible solvent and washing said solution with a water solution of an inert alkali metal salt.
11. In the process of separating residual water soluble carboxylic acid from a mixture of a water soluble carboxylic acid and butadiene monoxide resulting from the epoxidation of butadiene with a percarboxylic acid, the improvement which comprises forming a solution of said mixture of a water soluble carboxylic acid and butadiene monoxide in an inert water immiscible solvent and washing said solution with a water solution of an inert alkali metal salt at a temperature below 25° C.

References Cited in the file of this patent
UNITED STATES PATENTS

| | | |
|---|---|---|
| 2,458,484 | Terry et al. | Jan. 4, 1949 |
| 2,838,524 | Wilson | June 10, 1958 |
| 2,883,398 | Frostick et al. | Apr. 21, 1959 |

FOREIGN PATENTS

| | | |
|---|---|---|
| 531,112 | Canada | Oct. 2, 1956 |

OTHER REFERENCES

Findley et al.: J.A.C.S., vol. 67, pages 412–414 (1954).

Gall et al.: Ind. and Eng. Chem., vol. 47, No. 1, pages 147–148 (1955).

Fitzgerald et al.: Electronic Equipment, July 1956, pages 64–67.

UNITED STATES PATENT OFFICE
CERTIFICATE OF CORRECTION

Patent No. 3,019,234                            January 30, 1962

Malcolm Korach et al.

It is hereby certified that error appears in the above numbered patent requiring correction and that the said Letters Patent should read as corrected below.

Column 2, line 62, for "would" read -- could --; column 3, line 21, before "inert" insert -- an --; column 4, line 39, for "(1954)" read -- (1945) --.

Signed and sealed this 20th day of November 1962.

(SEAL)
Attest:

ERNEST W. SWIDER
Attesting Officer

DAVID L. LADD
                                                    Commissioner of Patents